(12) United States Patent
Wu et al.

(10) Patent No.: US 7,877,766 B1
(45) Date of Patent: Jan. 25, 2011

(54) METHOD AND SYSTEM OF PROVIDING A NON-SKIPPABLE SUB-ADVERTISEMENT STREAM

(75) Inventors: Bo Wu, San Jose, CA (US); Bin Lu, Stanford, CA (US)

(73) Assignee: Enreach Technology, Inc., San Jose, CA (US)

( * ) Notice: Subject to any disclaimer, the term of this patent is extended or adjusted under 35 U.S.C. 154(b) by 0 days.

(21) Appl. No.: 09/565,561

(22) Filed: May 4, 2000

(51) Int. Cl.
*H04H 20/14* (2008.01)
*H04N 5/91* (2006.01)

(52) U.S. Cl. .................. 725/22; 725/33; 725/34; 725/35; 725/36; 386/46; 386/83; 386/96; 386/124; 386/125

(58) Field of Classification Search ............ 705/14; 386/46, 95, 70, 82, 126, 68, 125, 83, 96, 386/94, 1, 52, 124; 725/32, 36, 22, 25, 34, 725/87, 104; 345/156
See application file for complete search history.

(56) References Cited

U.S. PATENT DOCUMENTS

| 3,987,484 A | * | 10/1976 | Bosche et al. ................ 386/69 |
| 3,987,494 A | * | 10/1976 | Nakabayashi et al. .... 360/261.2 |
| 4,780,757 A | | 10/1988 | Bryer et al. |
| 4,941,829 A | | 7/1990 | Estes et al. |
| 5,101,499 A | | 3/1992 | Streck et al. |
| 5,113,496 A | | 5/1992 | McCalley et al. |
| 5,206,929 A | | 4/1993 | Langford et al. |
| 5,233,423 A | | 8/1993 | Jernigan et al. |
| 5,263,167 A | | 11/1993 | Conner et al. |
| 5,339,392 A | | 8/1994 | Risberg et al. |
| 5,361,393 A | | 11/1994 | Rossillo |
| 5,517,652 A | | 5/1996 | Miyamoto et al. |
| 5,532,735 A | * | 7/1996 | Blahut et al. ................. 725/32 |
| 5,589,892 A | | 12/1996 | Knee et al. |
| 5,596,373 A | | 1/1997 | White et al. |
| 5,596,564 A | * | 1/1997 | Fukushima et al. .......... 386/70 |
| 5,600,364 A | | 2/1997 | Hendricks et al. |
| 5,654,886 A | | 8/1997 | Zereski et al. |

(Continued)

FOREIGN PATENT DOCUMENTS

EP  0852361  A2  7/1998

(Continued)

OTHER PUBLICATIONS

Non-Final Office Action Dated Mar. 12, 2003; U.S. Appl. No. 09/574,397.

(Continued)

*Primary Examiner*—Jamie J Atala (57) ABSTRACT

A method and system of providing a non-skippable sub-advertisement stream. The general idea of one embodiment in accordance with the present invention is that when a user of an electronic digital recording/play back device causes it to fast forward through or skip over a recorded television advertisement, an overlay screen corresponding to the skipped advertisement is displayed on a portion of a television screen once the user resumes watching the recorded television show in normal play back mode. As such, the user is exposed to content of the skipped advertisement while viewing the recorded television show. In this manner, the user of the electronic digital recording/play back device is unable to easily avoid viewing content corresponding to the skipped advertisement.

20 Claims, 7 Drawing Sheets

U.S. PATENT DOCUMENTS

| | | | |
|---|---|---|---|
| 5,673,089 A | 9/1997 | Yuen et al. | |
| 5,774,170 A | 6/1998 | Hite et al. | |
| 5,778,181 A | 7/1998 | Hidary et al. | |
| 5,790,935 A | 8/1998 | Payton | |
| 5,818,935 A | 10/1998 | Maa | |
| 5,826,085 A | 10/1998 | Bennett et al. | |
| 5,826,102 A | 10/1998 | Escobar et al. | |
| 5,828,839 A | 10/1998 | Moncreiff | |
| 5,838,314 A * | 11/1998 | Neel et al. | 725/8 |
| 5,844,552 A | 12/1998 | Gaughan et al. | |
| 5,850,218 A | 12/1998 | LaJoie et al. | |
| 5,861,906 A | 1/1999 | Dunn et al. | |
| 5,870,710 A | 2/1999 | Ozawa et al. | |
| 5,895,462 A | 4/1999 | Toki | |
| 5,905,865 A | 5/1999 | Palmer et al. | |
| 5,940,497 A | 8/1999 | Miloslavsky | |
| 5,946,048 A | 8/1999 | Levan | |
| 5,990,927 A * | 11/1999 | Hendricks et al. | 725/132 |
| 6,002,394 A | 12/1999 | Schein et al. | |
| 6,002,834 A * | 12/1999 | Hirabayashi et al. | 386/70 |
| 6,006,257 A | 12/1999 | Slezak | |
| 6,008,777 A | 12/1999 | Yiu | |
| 6,016,141 A | 1/2000 | Knudson et al. | |
| 6,018,764 A | 1/2000 | Field et al. | |
| 6,029,045 A | 2/2000 | Picco et al. | |
| 6,031,529 A | 2/2000 | Migos et al. | |
| 6,052,122 A | 4/2000 | Sutcliffe et al. | |
| 6,061,719 A | 5/2000 | Bendinelli et al. | |
| 6,073,171 A | 6/2000 | Gaughan et al. | |
| 6,088,722 A | 7/2000 | Herz et al. | |
| 6,100,881 A | 8/2000 | Gibbons et al. | |
| 6,100,941 A | 8/2000 | Dimitrova et al. | |
| 6,133,912 A | 10/2000 | Montero | |
| 6,141,010 A | 10/2000 | Hoyle | |
| 6,151,600 A | 11/2000 | Dedrick | |
| 6,154,738 A | 11/2000 | Call | |
| 6,184,878 B1 | 2/2001 | Alonso et al. | |
| 6,208,801 B1 * | 3/2001 | Kambayashi et al. | 386/95 |
| 6,209,130 B1 | 3/2001 | Rector, Jr. et al. | |
| 6,219,042 B1 | 4/2001 | Anderson et al. | |
| 6,239,784 B1 * | 5/2001 | Holmes | 345/156 |
| 6,239,794 B1 * | 5/2001 | Yuen et al. | 725/41 |
| 6,240,555 B1 | 5/2001 | Shoff et al. | |
| 6,282,713 B1 | 8/2001 | Kitsukawa et al. | |
| 6,297,853 B1 * | 10/2001 | Sharir et al. | 348/589 |
| 6,320,598 B2 | 11/2001 | Davis et al. | |
| 6,320,600 B1 | 11/2001 | Smith et al. | |
| 6,324,182 B1 | 11/2001 | Burns et al. | |
| 6,326,982 B1 | 12/2001 | Wu et al. | |
| 6,330,719 B1 | 12/2001 | Zigmond et al. | |
| 6,338,094 B1 | 1/2002 | Scott et al. | |
| 6,349,410 B1 | 2/2002 | Lortz | |
| 6,359,270 B1 | 3/2002 | Bridson | |
| 6,374,260 B1 | 4/2002 | Hoffert et al. | |
| 6,385,596 B1 | 5/2002 | Wiser et al. | |
| 6,392,664 B1 | 5/2002 | White et al. | |
| 6,404,977 B1 * | 6/2002 | Iggulden | 386/46 |
| 6,421,470 B1 | 7/2002 | Nozaki et al. | |
| 6,434,747 B1 | 8/2002 | Khoo et al. | |
| 6,441,832 B1 | 8/2002 | Tao et al. | |
| 6,445,777 B1 | 9/2002 | Clark | |
| 6,446,080 B1 | 9/2002 | Van Ryzin et al. | |
| 6,460,040 B1 | 10/2002 | Burns | |
| 6,462,778 B1 | 10/2002 | Abram et al. | |
| 6,463,585 B1 | 10/2002 | Hendricks et al. | |
| 6,483,986 B1 * | 11/2002 | Krapf | 386/68 |
| 6,490,602 B1 | 12/2002 | Kraemar | |
| 6,496,857 B1 | 12/2002 | Dustin et al. | |
| 6,513,069 B1 | 1/2003 | Abato et al. | |
| 6,519,771 B1 | 2/2003 | Zenith | |
| 6,526,577 B1 | 2/2003 | Knudson et al. | |
| 6,536,041 B1 | 3/2003 | Knudson et al. | |
| 6,546,556 B1 * | 4/2003 | Kataoka et al. | 725/35 |
| 6,549,922 B1 | 4/2003 | Srivastava et al. | |
| 6,553,179 B1 * | 4/2003 | Miwa et al. | 386/94 |
| 6,564,379 B1 | 5/2003 | Knudson et al. | |
| 6,564,380 B1 | 5/2003 | Murphy | |
| 6,601,103 B1 | 7/2003 | Goldschmidt Iki et al. | |
| 6,609,113 B1 | 8/2003 | O'Leary et al. | |
| 6,609,253 B1 | 8/2003 | Swix et al. | |
| 6,615,039 B1 | 9/2003 | Eldering | |
| 6,625,581 B1 | 9/2003 | Perkowski | |
| 6,633,547 B1 | 10/2003 | Akatsu et al. | |
| 6,636,983 B1 | 10/2003 | Levi | |
| 6,637,032 B1 | 10/2003 | Feinleib | |
| 6,640,335 B2 * | 10/2003 | Ebisawa | 717/172 |
| 6,643,624 B2 | 11/2003 | Philippe et al. | |
| 6,668,378 B2 | 12/2003 | Leak et al. | |
| 6,698,020 B1 * | 2/2004 | Zigmond et al. | 725/34 |
| 6,701,524 B1 | 3/2004 | Okamura et al. | |
| 6,704,930 B1 | 3/2004 | Eldering et al. | |
| 6,742,183 B1 | 5/2004 | Reynolds et al. | |
| 6,754,907 B1 | 6/2004 | Schumacher et al. | |
| 6,774,926 B1 | 8/2004 | Ellis et al. | |
| 6,799,326 B2 | 9/2004 | Boylan, III et al. | |
| 6,820,277 B1 | 11/2004 | Eldering et al. | |
| 6,873,974 B1 | 3/2005 | Schutzer | |
| 6,886,178 B1 | 4/2005 | Mao et al. | |
| 6,909,837 B1 * | 6/2005 | Unger | 386/68 |
| 6,944,877 B1 | 9/2005 | Lord et al. | |
| 6,973,669 B2 * | 12/2005 | Daniels | 725/112 |
| 6,983,478 B1 | 1/2006 | Grauch et al. | |
| 7,017,173 B1 | 3/2006 | Armstrong et al. | |
| 7,181,757 B1 | 2/2007 | Kim et al. | |
| 7,185,355 B1 | 2/2007 | Ellis et al. | |
| 2001/0027441 A1 | 10/2001 | Wankmueller | |
| 2001/0056434 A1 | 12/2001 | Kaplan et al. | |
| 2002/0032019 A1 | 3/2002 | Marks et al. | |
| 2002/0055880 A1 | 5/2002 | Unold et al. | |
| 2002/0059623 A1 | 5/2002 | Rodriguez et al. | |
| 2002/0066097 A1 | 5/2002 | Hattori et al. | |
| 2002/0069420 A1 | 6/2002 | Russell et al. | |
| 2002/0083441 A1 | 6/2002 | Flickinger et al. | |
| 2002/0194260 A1 | 12/2002 | Headley et al. | |
| 2003/0004809 A1 | 1/2003 | Palcic et al. | |
| 2003/0037068 A1 | 2/2003 | Thomas et al. | |
| 2003/0066085 A1 | 4/2003 | Boyer et al. | |
| 2003/0088872 A1 | 5/2003 | Maissel et al. | |
| 2003/0135853 A1 | 7/2003 | Goldman et al. | |
| 2003/0149988 A1 | 8/2003 | Ellis et al. | |
| 2003/0154486 A1 | 8/2003 | Dunn et al. | |
| 2003/0182184 A1 | 9/2003 | Strasnick et al. | |
| 2004/0117831 A1 | 6/2004 | Ellis et al. | |
| 2004/0215513 A1 * | 10/2004 | Fujisawa et al. | 705/14 |
| 2004/0261099 A1 | 12/2004 | Durden et al. | |
| 2005/0028208 A1 | 2/2005 | Ellis et al. | |
| 2005/0149964 A1 | 7/2005 | Thomas et al. | |
| 2005/0183119 A1 | 8/2005 | Hofrichter et al. | |
| 2005/0283800 A1 | 12/2005 | Ellis et al. | |
| 2006/0190966 A1 | 8/2006 | McKissick et al. | |
| 2008/0005130 A1 | 1/2008 | Logan et al. | |
| 2008/0127251 A1 | 5/2008 | Wachtfogel et al. | |

FOREIGN PATENT DOCUMENTS

| | | |
|---|---|---|
| EP | 0852361 A3 | 3/1999 |
| WO | WO 98/56188 | 12/1998 |
| WO | WO 99/04561 | 1/1999 |

OTHER PUBLICATIONS

Non-Final Office Action Dated May 9, 2003; U.S. Appl. No. 09/565,515.

Non-Final Office Action Dated Jul. 28, 2004; U.S. Appl. No. 09/997,041.

Final Office Action Dated Dec. 1, 2004; U.S. Appl. No. 09/997,041.
Non-Final Office Action Dated Sep. 2, 2005; U.S. Appl. No. 09/997,041.
Final Office Action Dated Jan. 24, 2006; U.S. Appl. No. 09/997,041.
Non-Final Office Action Dated May 18, 2006; U.S. Appl. No. 09/997,041.
Final Office Action Dated Sep. 21, 2006; U.S. Appl. No. 09/997,041.
Non-Final Office Action Dated Dec. 27, 2006; U.S. Appl. No. 09/997,041.
Final Office Action Dated Jun. 6, 2007; U.S. Appl. No. 09/997,041.
Non-Final Office Action Dated Oct. 29, 2007; U.S. Appl. No. 09/997,041.
Final Office Action Dated Apr. 4, 2008; U.S. Appl. No. 09/997,041.
Non-Final Office Action Dated Aug. 28, 2008; U.S. Appl. No. 09/997,041.
Final Office Action Dated Apr. 9, 2009; U.S. Appl. No. 09/997,041.
Non-Final Office Action Dated Sep. 10, 2009; U.S. Appl. No. 09/997,041.
Non-Final Office Action Dated May 13, 2004; U.S. Appl. No. 09/996,441.
Non-Final Office Action Dated Aug. 24, 2004; U.S. Appl. No. 09/659,952.
Final Office Action Dated Jun. 8, 2005; U.S. Appl. No. 09/659,952.
Non-Final Office Action Dated Jan. 13, 2006; U.S. Appl. No. 09/659,952.
Final Office Action Dated Jul. 13, 2006; U.S. Appl. No. 09/659,952.
Non-Final Office Action Dated Dec. 28, 2006; U.S. Appl. No. 09/659,952.
Final Office Action Dated Jun. 8, 2007; U.S. Appl. No. 09/659,952.
Non-Final Office Action Dated Oct. 24, 2007; U.S. Appl. No. 09/659,952.
Final Office Action Dated Jul. 1, 2008; U.S. Appl. No. 09/659,952.
Non-Final Office Action Dated Dec. 30, 2008; U.S. Appl. No. 09/659,952.
Final Office Action Dated Apr. 17, 2009; U.S. Appl. No. 09/659,952.
Notice of Allowance Dated Oct. 13, 2009; U.S. Appl. No. 09/659,952.
Notice of Allowance Dated Jan. 21, 2010; U.S. Appl. No. 09/659,952.
Non-Final Office Action Dated Aug. 24, 2004; U.S. Appl. No. 09/746,705.
Final Office Action Dated Jun. 6, 2005; U.S. Appl. No. 09/746,705.
Non-Final Office Action Dated Apr. 12, 2006; U.S. Appl. No. 09/746,705.
Final Office Action Dated Oct. 3, 2006; U.S. Appl. No. 09/746,705.
Final Office Action Dated Mar. 22, 2007; U.S. Appl. No. 09/746,705.
Non-Final Office Action Dated Nov. 14, 2007; U.S. Appl. No. 09/746,705.
Final Office Action Dated Nov. 28, 2008; U.S. Appl. No. 09/746,705.
Non-Final Office Action Dated May 27, 2009; U.S. Appl. No. 09/746,705.
Final Office Action Dated Jan. 22, 2010; U.S. Appl. No. 09/746,705.
Restriction / Election Requirement Office Action Dated Jul. 11, 2008; U.S. Appl. No. 09/746,705.
Notice of Allowance Dated Mar. 8, 2010; U.S. Appl. No. 09/997,041.
Houghton Mifflin Company; Definition of "Format"; The American Heritage Dictionary of the English Language, Fourth Edition; Published by Houghton Mifflin Company; Copyright 2000.
Non-Final Office Action Dated Jul. 13, 2010; U.S. Appl. No. 09/997,041.
Notice of Allowance Dated Jun. 16, 2010; U.S. Appl. No. 09/659,952.

* cited by examiner

Time Table
400

| Advertisement Time Intervals | |
|---|---|
| Ad 402 | 1200-1260 sec. |
| Ad 404 | 2340-2400 sec. |
| ⋮ | ⋮ |

METHOD AND SYSTEM OF PROVIDING A NON-SKIPPABLE SUB-ADVERTISEMENT STREAM

TECHNICAL FIELD

The present invention relates to the field of data streams. More specifically, the present invention relates to the field of digital media streams.

BACKGROUND ART

Modern research and technology have provided society with a wide variety of electronic devices. It is appreciated that some of these modern electronic devices are very powerful and useful to their users. For example, some of the electronic devices which fall into this category include: computers which occupy large office space down to computers which are held in one's hand, global positioning system (GPS) devices capable of determining the specific locations of their users on the earth, satellites which orbit around the earth relaying a multitude of communication signals, to name a few. Furthermore, it is also appreciated that some modern electronic devices also provide entertainment to their users. For instance, some of the electronic devices which fall into this category include: portable compact disc (CD) players which provide music to their users, video game consoles which challenge their users with different situations within different virtual realities, and televisions which provide a wide variety of visual and audio programming to their users.

Recently, an increasingly amount of television programming has become available to the general public. For example, 24 hours a day consumers of the general public are able to receive hundreds of channels of television programming within their households and businesses via personal satellite dishes (large or small), coaxial cables, and the like. Since there are so many choices of television programming available through these different technologies, consumers of the general public typically want to be empowered with more control over the varying television shows which they desire to watch.

One of the ways to provide consumers of the general public with more control over numerous television shows is through the use of an electronic digital recording/play back device. Currently, one of the well known brands of electronic digital recording/play back devices is commercially available under the name of TiVo®. Typically, the electronic digital recording/play back device has the ability to digitally record and subsequently play back specific television shows for its user. The electronic digital recording/play back device is commonly connected to output these recorded television shows to a television where they can be viewed by the user. Furthermore, the electronic digital recording/play back device usually enables its user to pause live television shows and subsequently continue to watch the paused television show at some later time. Additionally, during play back of a previously recorded television show, the electronic digital recording/play back device also enables its user to fast forward or skip through all or some of the recorded television show. As such, a user of the electronic digital recording/play back device typically fast forwards through or skips over advertisements previously recorded by their electronic digital recording/play back device.

However, it should be appreciated that there are disadvantages associated with users of electronic digital recording/play back devices fast forwarding through or skipping over advertisements. One of the main disadvantages is that television content providers will lose advertisement revenue. Specifically, as electronic digital recording/play back devices become increasingly popular with the general public, businesses which pay television content providers for advertisement time will become increasingly aware that their advertisements are not very effective. As such, these businesses are less likely to continue to pay television content providers for more advertisement time in the future if their advertisements are being fast forwarded through or skipped over by users of electronic digital recording/play back devices. Therefore, as it becomes increasingly more difficult for television content providers to solicit advertisement revenues from businesses, their available funding for television program development will be greatly reduced.

DISCLOSURE OF THE INVENTION

Accordingly, a need exists for a method and system which provides advertisement content and information to a user of an electronic digital recording/play back device which cannot be fast forwarded through or skipped over. Embodiments of the present invention provide a method and system which accomplishes the above described need.

The general idea of one embodiment in accordance with the present invention is that when a user of an electronic digital recording/play back device causes it to fast forward through or skip over a recorded television advertisement, an overlay screen corresponding to the skipped advertisement is displayed on a portion of a television screen once the user resumes watching the recorded television show in normal play back mode. As such, the user is exposed to content of the skipped advertisement while viewing the recorded television show. In this manner, the user of the electronic digital recording/play back device is unable to easily avoid viewing content corresponding to the skipped advertisement.

In another embodiment, the present invention includes a method for providing a non-skippable sub-advertisement to a display device. The method includes the step of determining if an advertisement of a recorded media stream was played back by an electronic digital recording/play back device for a specific amount of time. Furthermore, in response to the advertisement not being played back by an electronic digital recording/play back device for the specific amount of time, the method includes the step of outputting a sub-advertisement to a display device.

In still another embodiment, the present invention includes a system comprising a processor and an addressable data bus coupled to the processor. Furthermore, the system includes a computer readable memory coupled to communicate with the processor for performing a method for providing a non-skippable sub-advertisement to a display device. The method of this embodiment is similar to the method described above. For example, the method includes the step of determining if an advertisement of a recorded media stream was played back by the system for a specific amount of time. Additionally, in response to the advertisement not being played back by the system for the specific amount of time, the method includes the step of outputting a sub-advertisement to the display device.

In yet another embodiment, the present invention includes a computer readable medium having computer readable code embodied therein for causing a system to perform particular steps. The steps of this embodiment are similar to the steps of a method described above. The computer readable medium causes the system to perform the step of determining whether an advertisement of a recorded media stream was played back by the system for a specific amount of time. In response to the advertisement not being played back by the system for the specific amount of time, the computer readable medium causes the system to perform the step of outputting a sub-advertisement to a display device.

These and other advantages of the present invention will no doubt become obvious to those of ordinary skill in the art after having read the following detailed description of the preferred embodiments which are illustrated in the drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout discussions of the present invention, discussions utilizing terms such as "receiving" or "recognizing" or "utilizing" or "determining" or "playing" or "outputting" or "transmitting" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers or other such information storage, transmission, or display devices.

Figure 1:
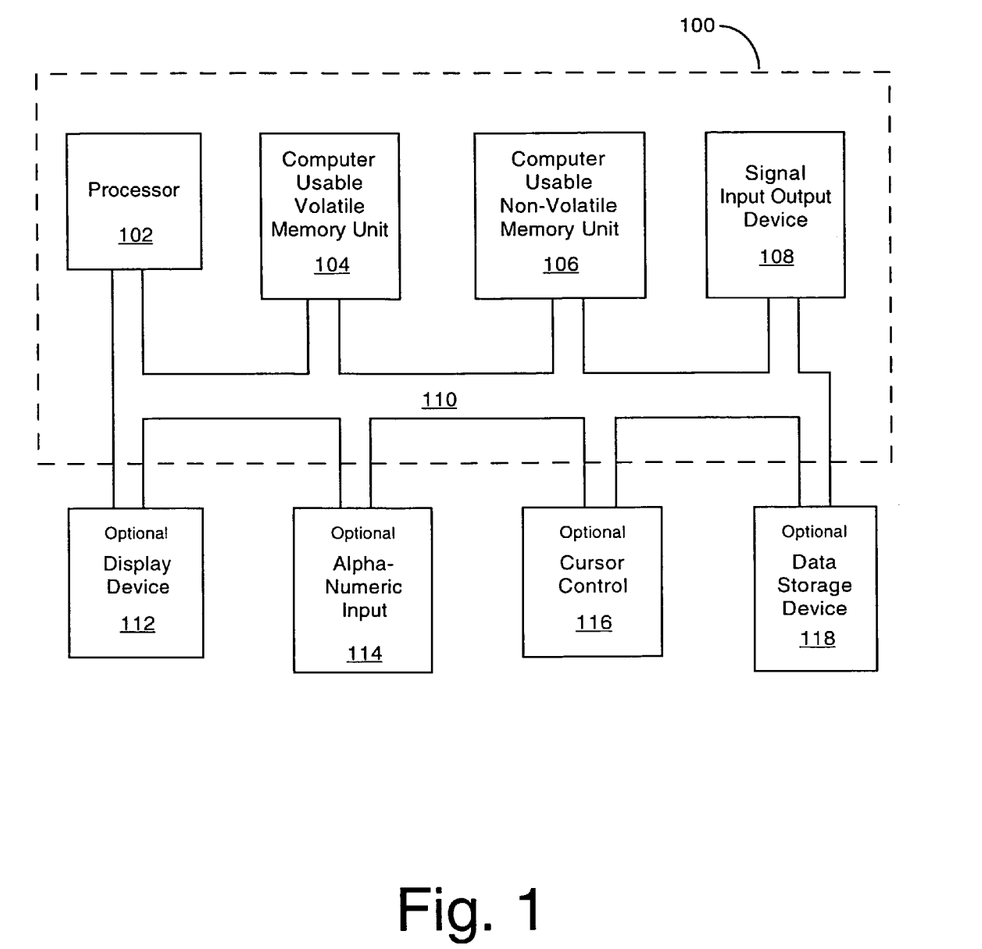
FIG. 1 is a block diagram of one embodiment of an exemplary electronic digital recording/play back system used in accordance with the present invention.

FIG. 1 is a block diagram of one embodiment of an exemplary electronic digital recording/play back system 100 used in accordance with the present invention. It should be appreciated that other electronic digital systems (e.g., a computer) can also be electronic digital recording/play back systems in accordance with the present invention. Within the following discussions of the present invention, certain processes and steps are discussed that are realized, in one embodiment, as a series of instructions (e.g., software program) that reside within computer readable memory units of electronic digital recording/play back system 100 and executed by processors of system 100. When executed, the instructions cause electronic digital recording/play back device 100 to perform specific actions and exhibit specific behavior which is described in detail below.

In general, electronic digital recording/play back system 100 of FIG. 1 used by an embodiment of the present invention comprises an address/data bus 110 for communicating information, one or more central processors 102 coupled with bus 110 for processing information and instructions. Central processor unit 102 may be a microprocessor or any other type of processor. The electronic digital recording/play back system 100 also includes data storage features such as a computer usable volatile memory unit 104 (e.g., random access memory, static RAM, dynamic RAM, etc.) coupled with bus 110 for storing information and instructions for central processor(s) 102, a computer usable non-volatile memory unit 106 (e.g., read only memory, programmable ROM, flash memory, EPROM, EEPROM, etc.) coupled with bus 110 for storing static information and instructions for processor(s) 102. Electronic digital recording/play back system 100 also includes a signal generating and receiving device 108 coupled with bus 110 for enabling system 100 to interface with other electronic devices.

Optionally, electronic digital recording/play back system 100 can include a display device 112 which is coupled to bus 110 for displaying video and/or graphics. It should be appreciated that optional display device 112 may be a cathode ray tube (CRT), flat panel liquid crystal display (LCD), field emission display (FED), or other display device suitable for displaying video and/or graphic images and alphanumeric characters recognizable to a user. Furthermore, the electronic digital recording/play back system 100 can include an optional alphanumeric input device 114 including alphanumeric and function keys coupled to the bus 110 for communicating information and command selections to the central processor(s) 102.

Additionally, the electronic digital recording/play back device 100 of FIG. 1 can include an optional cursor control or cursor directing device 116 coupled to the bus 110 for communicating user input information and command selections to the central processor(s) 102. The cursor directing device 116 can be implemented using a number of well known devices such as a mouse, a track ball, a track pad, an optical tracking device, a touch screen, etc. Alternatively, it is appreciated that a cursor can be directed and/or activated via input from alphanumeric input device 112 using special keys and key sequence commands. The present invention is also well suited to directing a cursor by other means such as, for example, voice commands. In addition, the cursor directing device 116 can also be a remote control device (e.g., a universal remote control device having a number of buttons, dials, etc.) with an infra-red signal communication capability. Electronic digital recording/play back system 100 can also include a computer usable mass data storage device 118 such as a magnetic or optical disk and disk drive (e.g., hard drive or floppy diskette) coupled with bus 110 for storing information and instructions.

Figure 2:
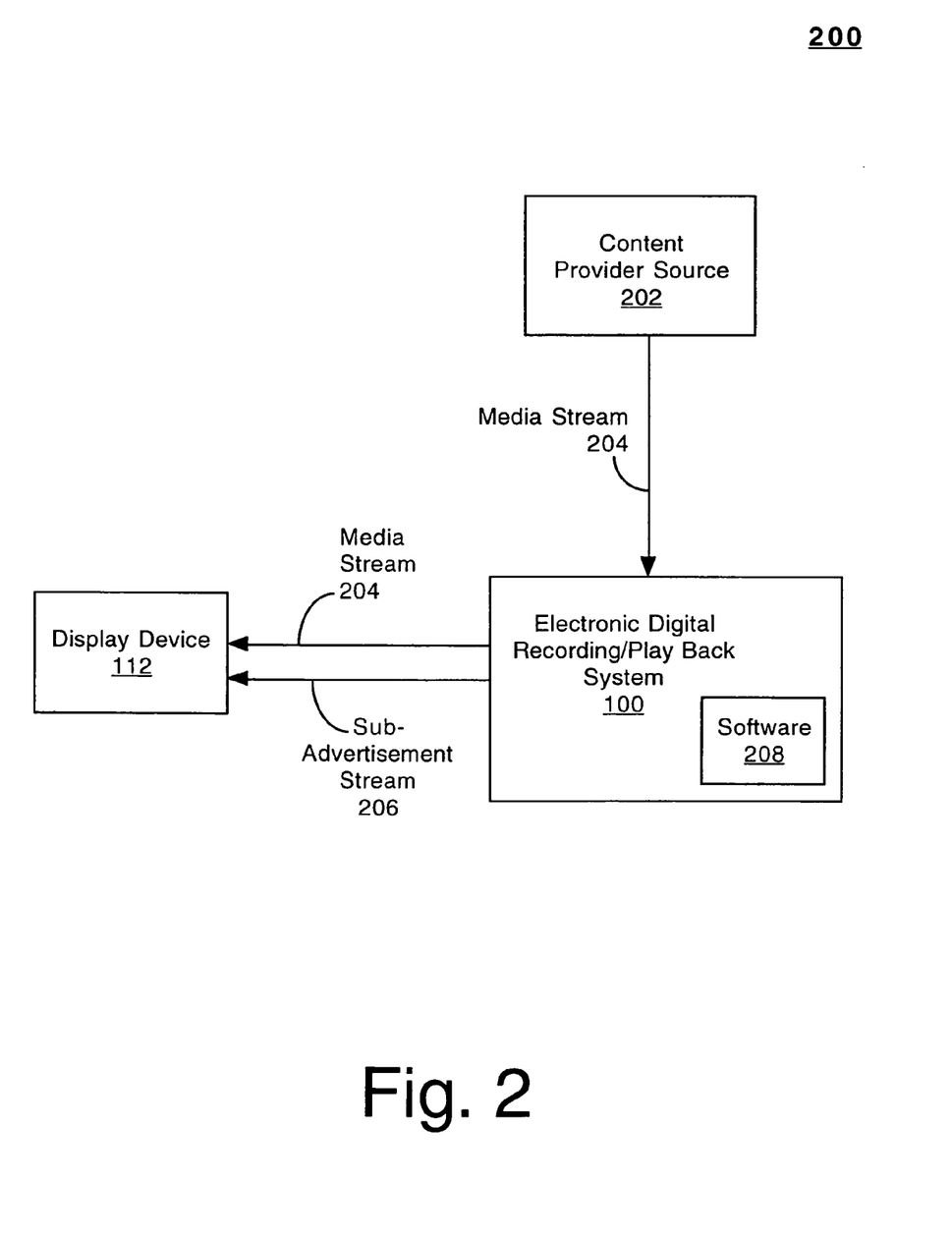
FIG. 2 is a block diagram illustrating one embodiment of a consumer electronic network system in accordance with the present invention.

With reference now to FIG. 2, which is a block diagram illustrating one embodiment of a consumer electronic network system 200 in accordance with the present invention. The general idea of the present embodiment is that when a user of electronic digital recording/play back system 100 causes it to fast forward through or skip over a recorded television advertisement of media stream 204, an overlay sub-advertisement stream 206 corresponding to the skipped advertisement is displayed on a portion of the screen of display device 112 once the user resumes watching the recorded television show in normal play back mode. Therefore, the user is exposed to content of the skipped advertisement while viewing the recorded television show of media stream 204. As such, the user of electronic digital recording/play back device 100 is unable to easily avoid viewing content corresponding to the skipped advertisement of media stream 204.

Network 200 includes a content provider source 202 (e.g., television broadcast company, the Internet, television cable company, and the like) coupled to electronic digital recording/play back system 100, which is coupled to display device 112. As such, the electronic digital recording/play back device 100 is coupled to receive a media stream 204 which is output by content provider source 202. Furthermore, the display device 112 is coupled to receive media stream 204 which is output by electronic digital recording/play back system 100. It is appreciated that content provider source 202 and electronic digital recording/play back device 100 of the present embodiment are well suited to be coupled in a wide variety of implementations. For example, content provider source 202 and electronic digital recording/play back system 100 may be coupled via coaxial cable, copper wire, the Internet, fiber optics, wireless communication, and the like. Moreover, the electronic digital recording/play back device 100 and display device 112 of the present embodiment are also well suited to be coupled in a wide variety of implementations. For instance, electronic digital recording/play back system 100 and display device 112 may be coupled via fiber optics, wireless communication, coaxial cable, the Internet, copper wire, and the like.

Figure 3:
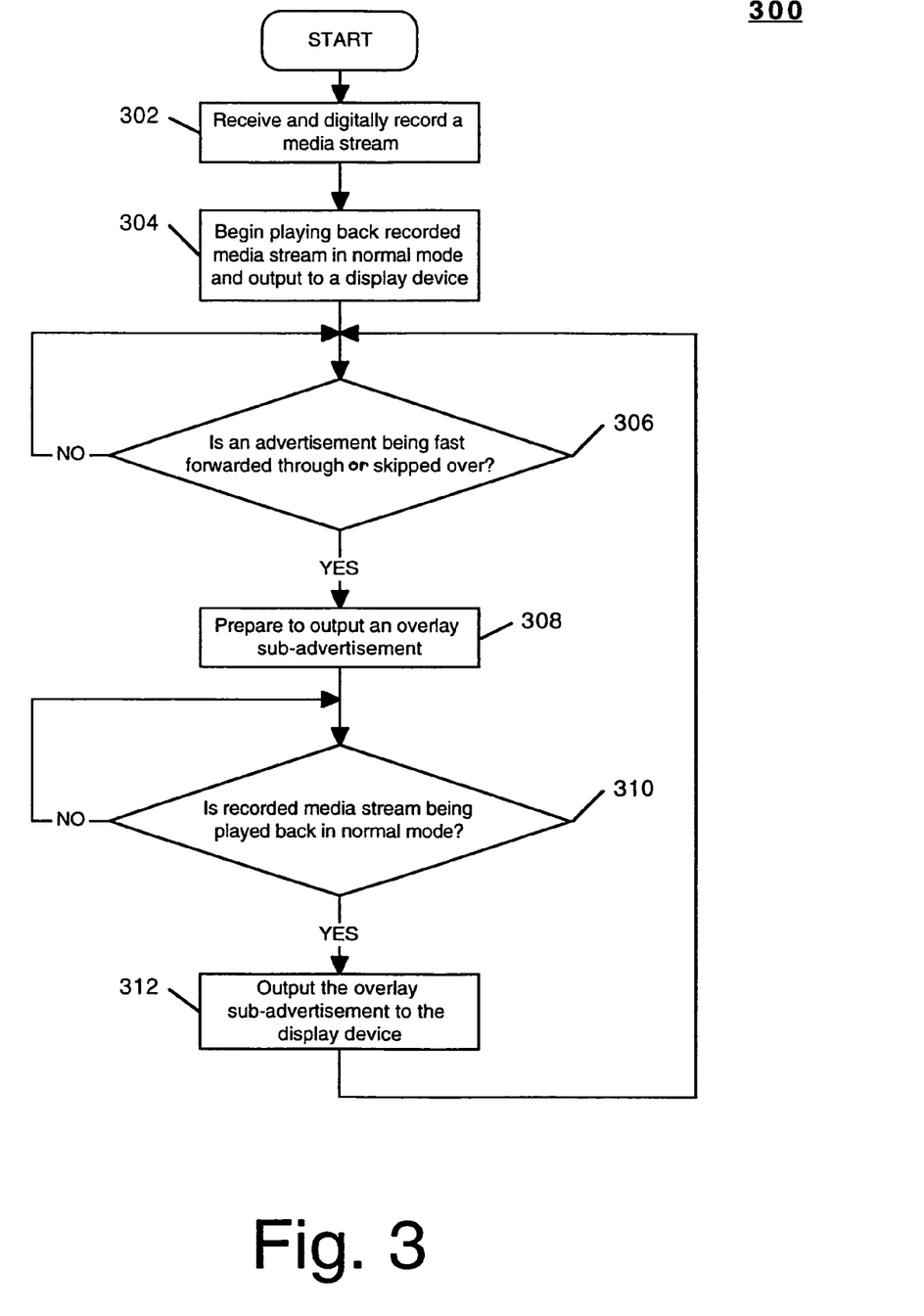
FIG. 3 is a flowchart of steps performed in accordance with one embodiment of the present invention for providing a non-skippable sub-advertisement to a display device.

With reference to FIG. 3, which is a flowchart 300 of steps performed in accordance with one embodiment of the present invention for providing non-skippable advertisements to a display device. Flowchart 300 includes processes of the present invention which, in one embodiment, are carried out by a processor and electrical components under the control of computer readable and computer executable instructions. The computer readable and computer executable instructions reside, for example, in data storage features such as computer usable volatile memory 104 and/or computer usable non-volatile memory 106 of FIG. 1. However, the computer readable and computer executable instructions may reside in any type of computer readable medium. Although specific steps are disclosed in flowchart 300, such steps are exemplary. That is, the present invention is well suited to performing various other steps or variations of the steps recited in FIG. 3. Within the present embodiment, it should be appreciated that the steps of flowchart 300 can be performed by software or hardware or any combination of software and hardware.

In step 302, in the present embodiment, the electronic digital recording/play back system 100 (FIG. 2) receives media stream 204 output by content provider source 202 and digitally records it. The electronic digital recording/play back system 100 may be previously programmed in order to digitally record media stream 204. Furthermore, it is appreciated that as media stream 204 is digitally recorded at step 302, an incrementing time reference may also be recorded in conjunction with media stream 204. The purpose for the present embodiment recording in this manner is described below with reference to step 306. The media stream 204 of the present embodiment includes television programming together with several different advertisements. However, it is understood that media stream 204 of the present embodiment is well suited to include a wide variety of different data and information in a wide variety of different formats (e.g., digital, analog, MPEG, etc.). For example, media stream 204 of the present embodiment may be embedded with flags, each one identifying an advertisement.

At step 304 of FIG. 3, within the present embodiment, at some later time the electronic digital recording/play back system 100 is caused (e.g., by a user) to begin playing back in normal mode the digitally recorded media stream 204. As such, electronic digital recording/play back device 100 begins outputting media stream 204 to display device 112 at step 304. In this manner, the user is able to view on display device 112 the digitally recorded television programming and advertisements of media stream 204.

In step 306, the present embodiment determines whether an advertisement of recorded media stream 204 is being fast forwarded through or skipped over during normal play back mode. In other words, the present embodiment determines whether an advertisement of recorded media stream 204 was played back in normal mode by electronic digital recording/play back device 100 for a specific amount of time. If an advertisement of recorded media stream 204 is not being fast forwarded through or skipped over during normal play back mode, the present embodiment proceeds to the beginning of step 306. However, if an advertisement of recorded media stream 204 is being fast forwarded through or skipped over during normal play back mode, the present embodiment proceeds to step 308.

With reference to step 306 of FIG. 3, it is appreciated that while viewing recorded media stream 204 in normal play back mode, the user may cause electronic digital recording/play back system 100 to fast forward through or skip over advertisements. As such, it is understood that step 306 of the present embodiment is well suited to utilize a wide variety of implementations to determine or detect when an advertisement of recorded media stream 204 is being fast forwarded through or skipped over during normal play back mode. For example, software 208 (in accordance with the present embodiment) operating on electronic digital recording/play back system 100 would be able to determine whether or not an advertisement is being fast forwarded through or skipped over during normal play back mode. Additionally, there are many different ways in accordance with the present embodiment that software 208 can perform the functionality of step 306.

Figure 4A:
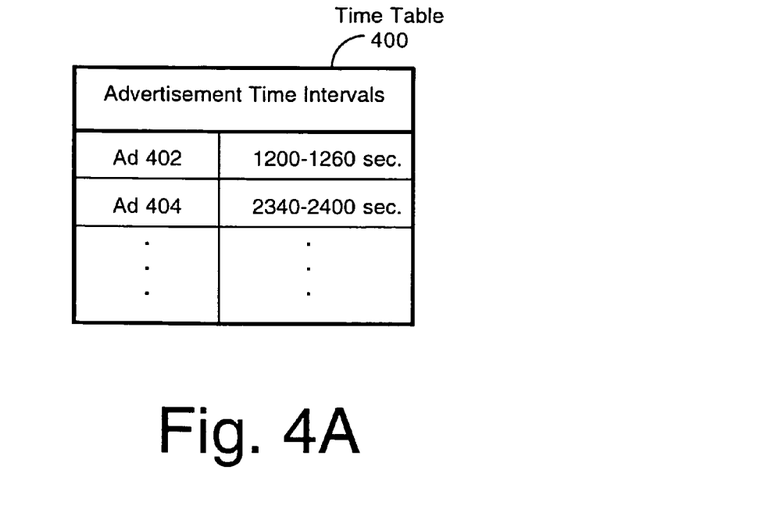
FIG. 4A illustrates one embodiment of a time table in accordance with the present invention for determining when an advertisement is being fast forwarded through or skipped over.
Figure 4B:
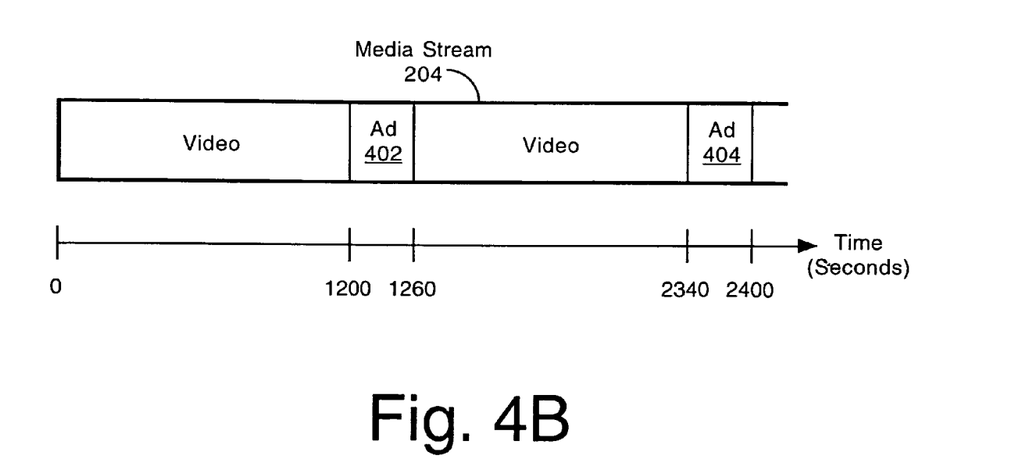
FIG. 4B is a block diagram illustrating a media stream in accordance with one embodiment of the present invention which corresponds to the time table of FIG. 4A.

For instance, FIG. 4A illustrates one embodiment of a time table 400 in accordance with the present invention which may be created and utilized by software 208 to determine at step 306 whether an advertisement of recorded media stream 204 is being fast forwarded through or skipped over during normal play back mode. Specifically, time table 400 of FIG. 4A corresponds to FIG. 4B, which illustrates an incrementing time reference digitally recorded in conjunction with media stream 204 (which is one embodiment of step 302 in accordance with the present invention). As such, the specific time intervals of the advertisements (e.g., 402 and 404) are stored within time table 400 thereby enabling software 208 to detect when an advertisement of recorded media stream 204 is being fast forwarded through or skipped over during normal play back mode.

Moreover, if electronic digital recording/play back system 100 receives and records a media stream 204 that is embedded with flags identifying each advertisement, software 208 may utilize those flags to determine when an advertisement of recorded media stream 204 is being fast forwarded through or skipped over during normal play back mode.

At step 308 of FIG. 3, the present embodiment prepares to output an overlay sub-advertisement stream 206. It should be appreciated that sub-advertisement 206 of the present embodiment is well suited not to be an overlay screen. Within the present embodiment, the content of sub-advertisement 206 may or may not correspond to the skipped advertisement of recorded media stream 204. Furthermore, sub-advertisement stream 206 may be provided as part of recorded media stream 204 or it may be provided by another source (e.g., a memory device of electronic digital recording/play back system 100) as a different stream. Additionally, sub-advertisement stream 206 of the present embodiment is well suited to be any type of data format. For example, sub-advertisement stream 206 may be a MPEG (Moving Pictures Experts Group) program stream or clip. Furthermore, sub-advertisement 206 may be an animation stream (e.g., avi, realvideo, flash, etc.). The sub-advertisement stream 206 may be a simpler format stream such as flash or overlay graphics substream.

Moreover, sub-advertisement 206 of the present embodiment may also be a size compressed version of the skipped advertisement of recorded media stream 204. It is understood that sub-advertisement 206 may be stored by a memory device of electronic digital recording/play back system 100 (e.g., computer usable volatile memory unit 104, computer useable non-volatile memory unit 106, mass data storage device 118) or by some other remote memory device (e.g., a memory device of a server computer). Additionally, sub-advertisement 206 stored by a memory device of electronic digital recording/play back system 100 may be updated from time to time by a remote source (e.g., a computer via the Internet). At step 308, it is further appreciated that the present embodiment may use a wide variety of parameters (e.g., priority of advertisement, time of advertisement, source of advertisement, etc.) to determine which sub-advertisement 206 to prepare for output.

In step 310, the present embodiment determines whether the recorded media stream 204 is being played back in the normal mode. If the recorded media stream 204 is not being played back in the normal mode, the present embodiment proceeds to the beginning of step 310. Conversely, if the recorded media stream 204 is being played back in the normal mode, the present embodiment proceeds to step 312.

In step 312 of FIG. 3, the present embodiment outputs sub-advertisement advertisement stream 206 together with the recorded media stream 204 are received and displayed simultaneously by display device 112. Specifically, display device 112 displays the recorded television show (for example) of media stream 204 while also stream 206 as an overlay screen to display device 112. As such, the sub-displaying sub-advertisement 206 as an overlay screen. Therefore, during normal play back mode, the user is able to view sub-advertisement stream 206 (e.g., corresponding to the skipped advertisement) while viewing the recorded television show of media stream 204. In this manner, the user of electronic digital recording/play back device 100 is unable to easily avoid viewing content (sub-advertisement 206) corresponding to the skipped advertisement of recorded media stream 204.

Referring to step 312, it should be appreciated that sub-advertisement 206 of the present embodiment does not have to be shown simultaneously with the recorded media stream 204. For example, the output of the recorded media stream 204 to display device 112 may be stopped or paused while the present embodiment outputs sub-advertisement stream 206 as a full screen display to display device 112. Once the output of sub-advertisement stream 206 to display device 112 is completed, the output of the recorded media stream 204 to display device 112 would continue.

With reference still to step 312, it is understood that sub-advertisement 206 of the present embodiment cannot be turned off, fast forwarded through, or skipped over by the user of electronic digital recording/play back device 100. Furthermore, the length of time the present embodiment outputs sub-advertisement 206 to display device 112 may be based on many different factors (e.g., length of skipped advertisement). Additionally, the present embodiment may output sub-advertisement 206 as an overlay full screen display to display device 112. Moreover, the present embodiment may locate sub-advertisement 206 (of any format, size, and style) anywhere on the screen of display device 112.

Figure 5A:
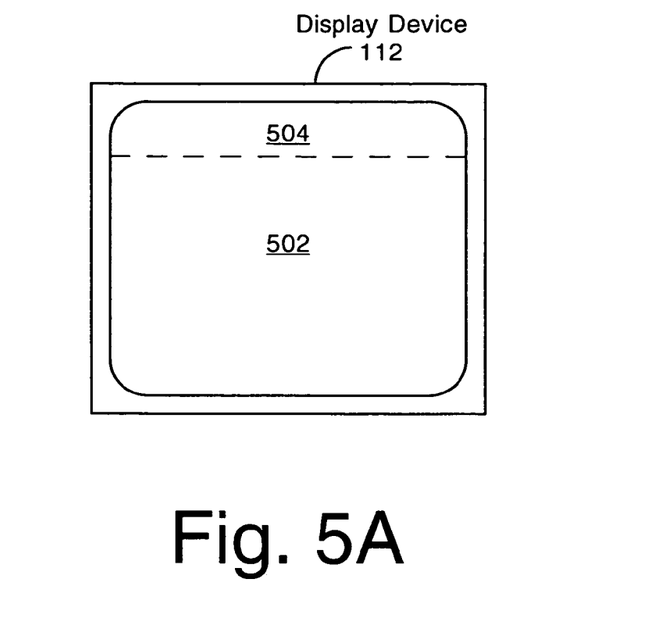
FIG. 5A is a block diagram illustrating one embodiment of an overlay screen located on the top portion of a screen of a display device in accordance with the present invention.
Figure 5B:
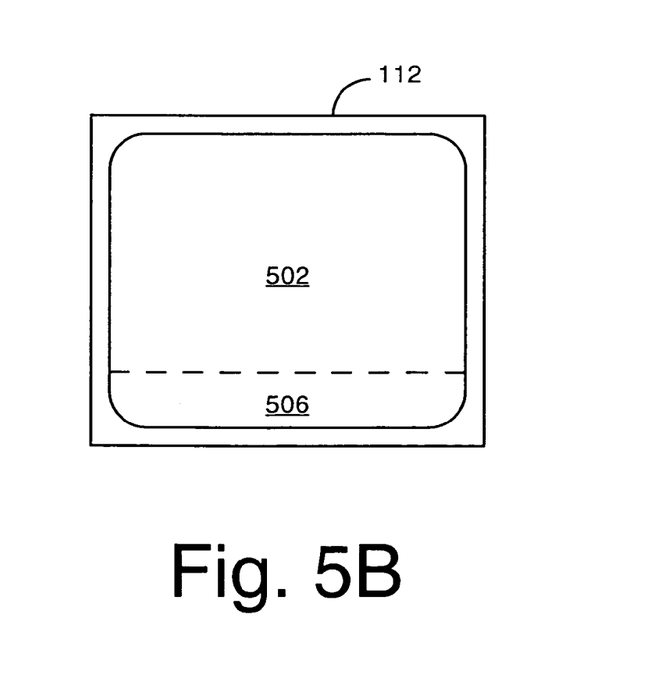
FIG. 5B is a block diagram illustrating one embodiment of an overlay screen located on the bottom portion of a screen of a display device in accordance with the present invention.

For example, FIGS. 5A-5E are block diagrams illustrating several embodiments in accordance with the present invention for displaying sub-advertisement stream 206 during step 312. Specifically, FIG. 5A is a block diagram illustrating an overlay screen 504 located by the present embodiment on the top portion of screen 502 of display device 112. In this manner, sub-advertisement stream 206 is displayed within overlay screen 504 while the recorded television show (for example) of media stream 204 is displayed within the remaining portion of screen 502. FIG. 5B is a block diagram illustrating an overlay screen 506 located by the present embodiment on the bottom portion of screen 502 of display device 112. It is appreciated that sub-advertisement stream 206 is displayed within overlay screen 506 while the recorded media stream 204 is displayed within the remaining portion of screen 502.

Figure 5C:
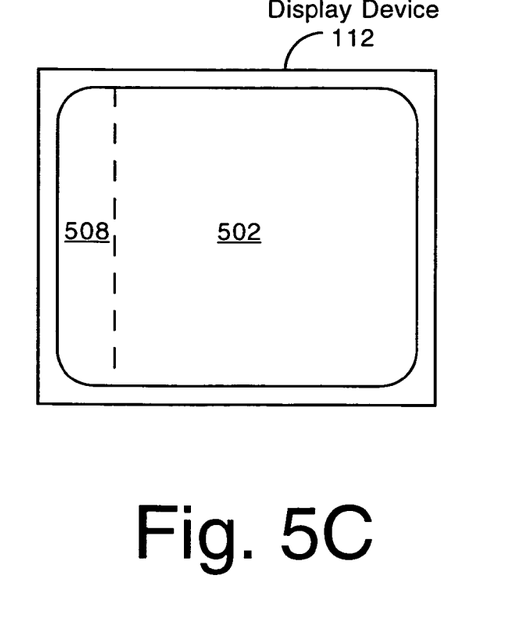
FIG. 5C is a block diagram illustrating one embodiment of an overlay screen located on the left side portion of a screen of a display device in accordance with the present invention.
Figure 5D:
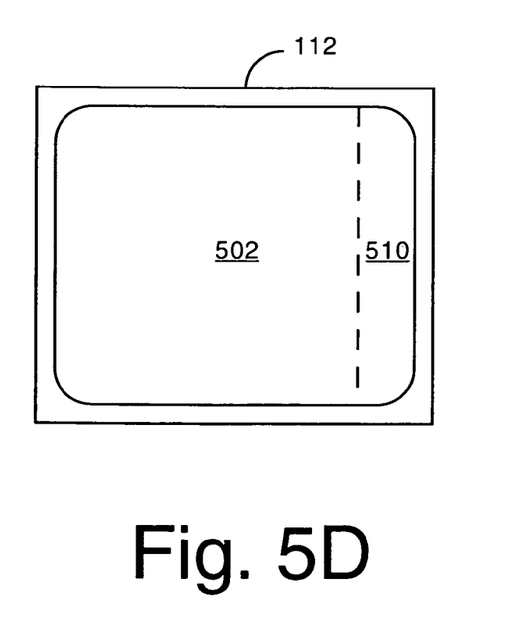
FIG. 5D is a block diagram illustrating one embodiment of an overlay screen located on the right side portion of a screen of a display device in accordance with the present invention.

Furthermore, FIG. 5C is a block diagram illustrating an overlay screen 508 located by the present embodiment on the left side portion of screen 502 of display device 112. As such, sub-advertisement stream 206 is displayed within overlay screen 508 while the recorded media stream 204 is displayed within the remaining portion of screen 502. FIG. 5D is a block diagram illustrating an overlay screen 510 located by the present embodiment on the right side portion of screen 502 of display device 112. Accordingly, sub-advertisement stream 206 is displayed within overlay screen 510 while the recorded media stream 204 is displayed within the remaining portion of screen 502.

Figure 5E:
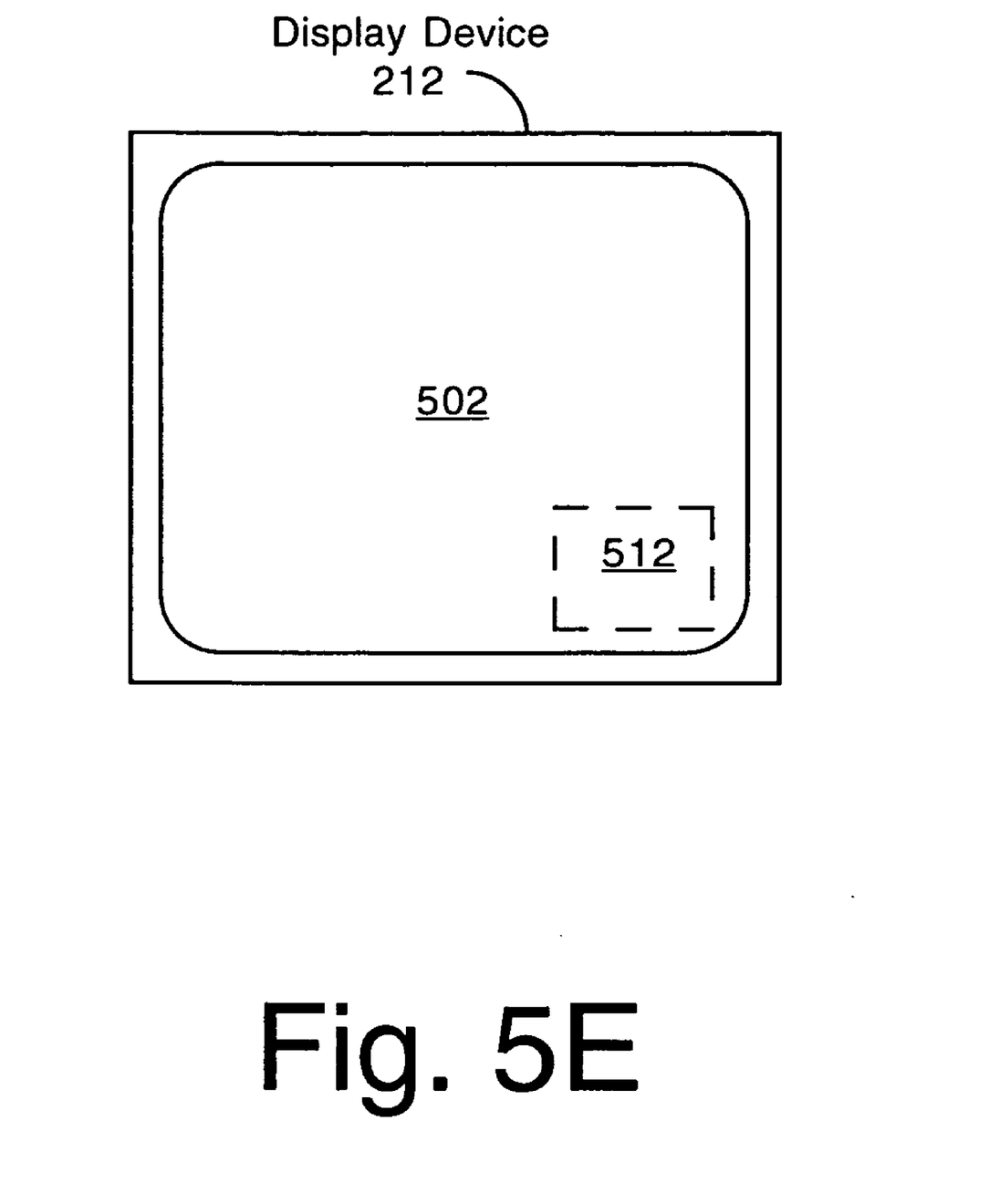
FIG. 5E is a block diagram illustrating one embodiment of a picture-in-picture overlay screen located on the lower right portion of a screen of a display device in accordance with the present invention.

FIG. 5E is a block diagram illustrating a picture-in-picture (PIP) overlay screen 512 located by the present embodiment on the lower right portion of screen 502 of display device 112. It is understood that sub-advertisement stream 206 is displayed within picture-in-picture overlay screen 512 while the recorded media stream 204 is displayed within the remaining portion of screen 502. Furthermore, it is appreciated that picture-in-picture overlay screen 512 of the present embodiment is well suited to be located anywhere on screen 502 of display device 112.

With reference still to FIG. 3, it is appreciated that once step 312 is completed, the present embodiment proceeds to the beginning of step 306. It is appreciated that flowchart 300 of the present embodiment is well suited to performing various other steps or variations of the steps recited in FIG. 3. For example, flowchart 300 may be altered such that if recorded media stream 204 is not played back by electronic digital recording/play back system 100 for a predefined amount of time (e.g., 10 minutes), a sub-advertisement stream 206 is not output to display device 112. In this manner, if a viewer only watches five minutes of a first recorded show and then decides to watch a second recorded show, the viewer is not subjected to watch a sub-advertisement associated with the first recorded show.

Accordingly, embodiments of the present invention provide a method and system which provides advertisement content and information to a user of an electronic digital recording/play back device which cannot be fast forwarded through or skipped over.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method comprising:
 receiving a media stream with an electronic digital recording/play back device, said media stream comprising television programming and an advertisement;
 digitally recording said media stream with said electronic digital recording/play back device resulting in a digitally recorded media stream, wherein said digitally recording said media stream further comprises recording an incrementing time reference in conjunction with said media stream;
 after said digitally recording said media stream, beginning play back mode of said digitally recorded media stream with said electronic digital recording/play back device;
 during said play back mode, outputting said digitally recorded media stream to a display device with said electronic digital recording/play back device;
 during said play back mode of said digitally recorded media stream, detecting when said advertisement of said digitally recorded media stream is fast forwarded through by said electronic digital recording/play back device, wherein said detecting further comprises utilizing a time table;
 after said detecting, determining if said play back mode of said digitally recorded media stream was for a predefined amount of time;
 after said detecting, determining whether said digitally recorded media stream resumes said play back mode; and
 provided said play back mode of said digitally recorded media stream was for a predefined amount of time and provided said digitally recorded media stream resumes said play back mode, outputting a sub-advertisement stream as an overlay screen on said display device with said electronic digital recording/play back device so that said sub-advertisement stream and said digitally recorded media stream are displayed simultaneously on said display device, said sub-advertisement stream is independent from said digitally recorded media stream, said sub-advertisement stream cannot be turned off.

2. The method as described in claim 1 wherein said outputting said sub-advertisement stream has a duration based on the length of said advertisement that was fast forwarded through.

3. The method as described in claim 1 wherein said sub-advertisement stream is a size compressed version of said advertisement that was fast forwarded through.

4. The method as described in claim 1 wherein said time table comprises a time interval of said advertisement.

5. The method as described in claim 4 wherein said sub-advertisement stream is displayed in a side portion, a bottom portion, or a top portion of a screen of said display device.

6. The method as described in claim 4 wherein said sub-advertisement stream is displayed within a picture-in-picture overlay screen.

7. The method as described in claim 2 wherein said sub-advertisement stream corresponds to said advertisement.

8. A system comprising:
 a processor;
 an addressable data bus coupled to said processor;
 a computer readable memory coupled to communicate with said processor for performing a method comprising:
 receiving a media stream with said system, said media stream comprising television programming and an advertisement;
 digitally recording said media stream with said system resulting in a digitally recorded media stream, wherein said digitally recording said media stream further comprises recording an incrementing time reference in conjunction with said media stream;
 after said digitally recording said media stream, beginning play back mode of said digitally recorded media stream with said system;

during said play back mode, outputting said digitally recorded media stream to a display device with said system;

during said play back mode of said digitally recorded media stream, detecting when said advertisement of said digitally recorded media stream is fast forwarded through by said system, wherein said detecting further comprises utilizing a time table;

after said detecting, determining if said play back mode of said digitally recorded media stream was for a predefined amount of time;

after said detecting, determining whether said digitally recorded media stream resumes said play back mode; and provided said play back mode of said digitally recorded media stream was for a predefined amount of time and provided said digitally recorded media stream resumes said play back mode, stopping said play back mode of said digitally recorded media stream and outputting a full screen sub-advertisement stream to said display device with said system, said full screen sub-advertisement stream is separate from said digitally recorded media stream, said full screen sub-advertisement stream cannot be turned off.

9. The system of claim 8 wherein said method further comprising:

after said outputting of said full screen sub-advertisement stream is complete, continuing said play back mode of said digitally recorded media stream by said system.

10. The system of claim 9 wherein said full screen sub-advertisement stream is stored by said system.

11. The system of claim 10 wherein said full screen sub-advertisement stream is updated by a remote source.

12. The system of claim 10 wherein said outputting said full screen sub-advertisement stream has a duration based on the length of said advertisement that was fast forwarded through.

13. A computer readable memory unit having computer readable code embodied therein for causing an electronic digital recording/play back device to perform a method comprising:

receiving a media stream with said electronic digital recording/play back device, said media stream comprising television programming and an advertisement;

digitally recording said media stream with said electronic digital recording/play back device resulting in a digitally recorded media stream, wherein said digitally recording said media stream further comprises recording an incrementing time reference in conjunction with said media stream;

after said digitally recording said media stream, beginning play back mode of said digitally recorded media stream with said electronic digital recording/play back device;

during said play back mode, outputting said digitally recorded media stream to a display device with said electronic digital recording/play back device;

during said play back mode of said digitally recorded media stream, detecting when said advertisement of said digitally recorded media stream is fast-forwarded through by said electronic digital recording/play back device, wherein said detecting further comprises utilizing a time table;

after said detecting, determining if said play back mode of said digitally recorded media stream was for a predefined amount of time;

after said detecting, determining if said digitally recorded media stream resumes said play back mode; and provided said play back mode of said digitally recorded media stream was for a predefined amount of time and provided said digitally recorded media stream resumes said play back mode, outputting an overlay sub-advertisement stream to said display device with said electronic digital recording/play back device so that said overlay sub-advertisement stream and said digitally recorded media stream are displayed simultaneously on said display device, said overlay sub-advertisement stream is separate from said digitally recorded media stream, said overlay sub-advertisement stream cannot be turned off.

14. The computer readable memory unit of claim 13 wherein said outputting said overlay sub-advertisement stream has a duration based on the length of said advertisement that was fast forwarded through.

15. The computer readable memory unit of claim 14 wherein said overlay sub-advertisement stream is updated by a remote source.

16. The computer readable memory unit of claim 14 wherein said overlay sub-advertisement stream is displayed within a picture-in-picture overlay screen.

17. The computer readable memory unit of claim 14 wherein said overlay sub-advertisement stream does not correspond to said advertisement.

18. The computer readable memory unit of claim 15 wherein said overlay sub-advertisement stream comprises a size compressed version of said advertisement that was fast forwarded through.

19. The computer readable memory unit of claim 15 wherein said overlay sub-advertisement stream corresponds to said advertisement.

20. The computer readable memory unit of claim 15 wherein said overlay sub-advertisement stream comprises a full screen display.

* * * * *